Patented June 27, 1933

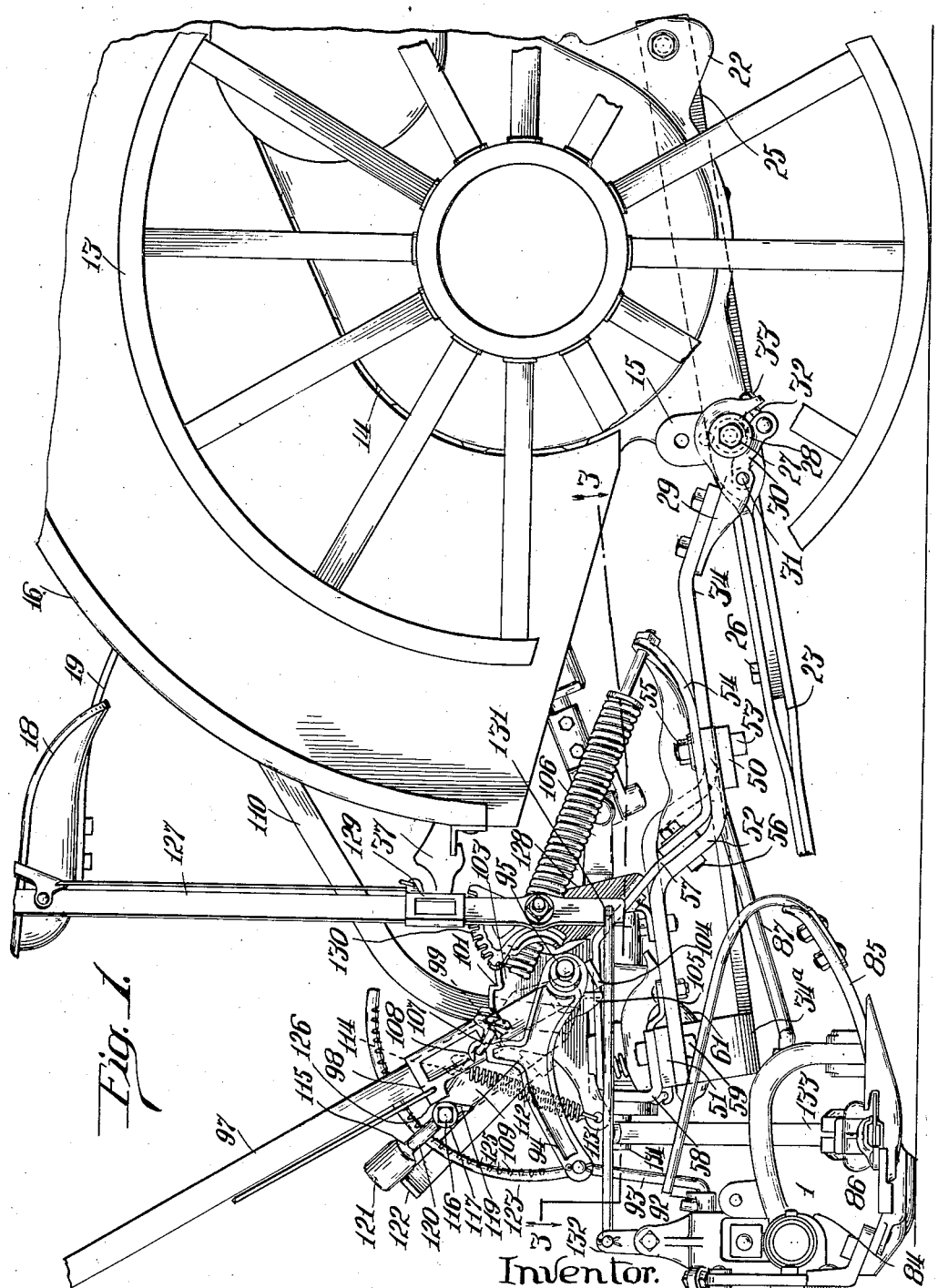

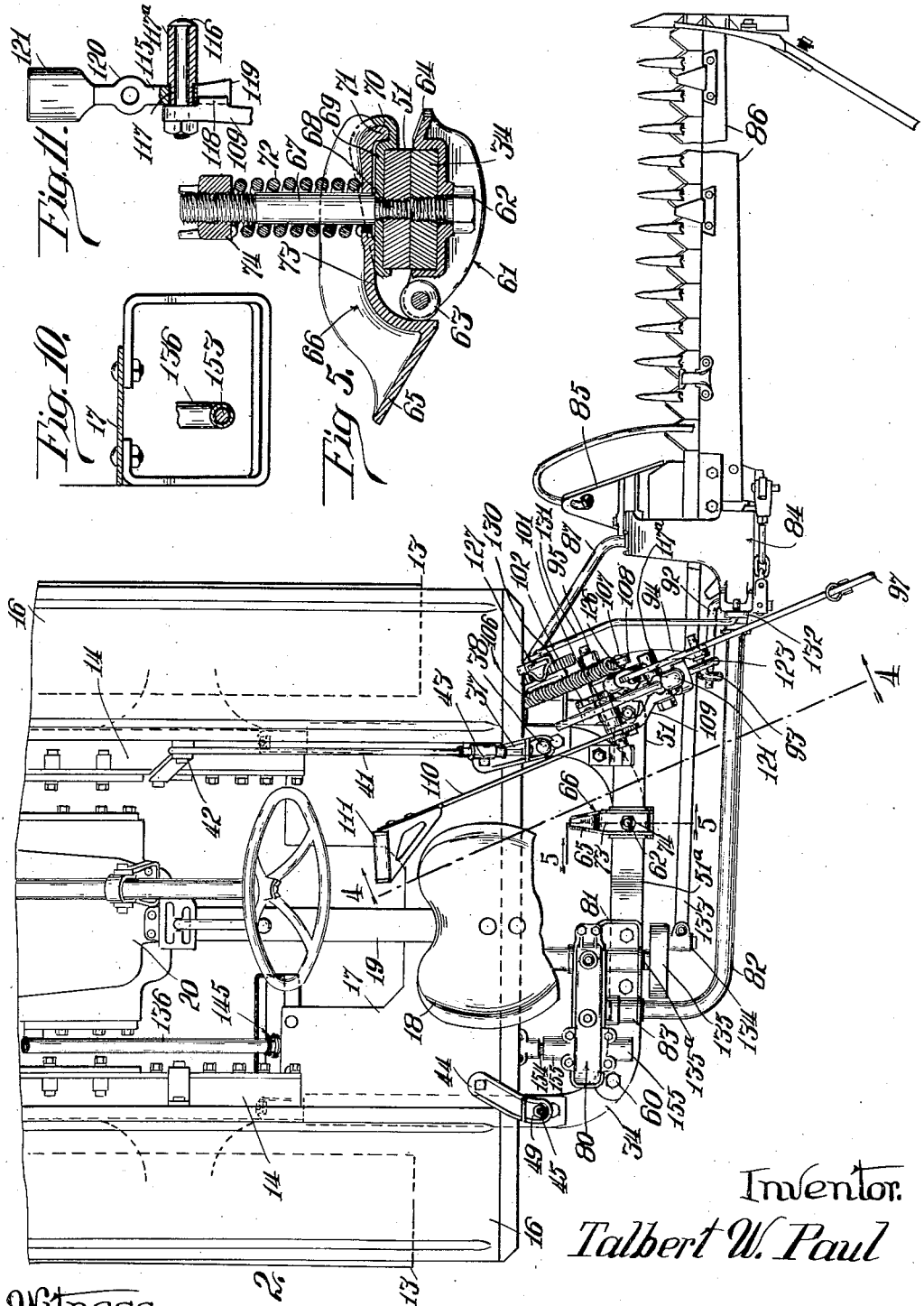

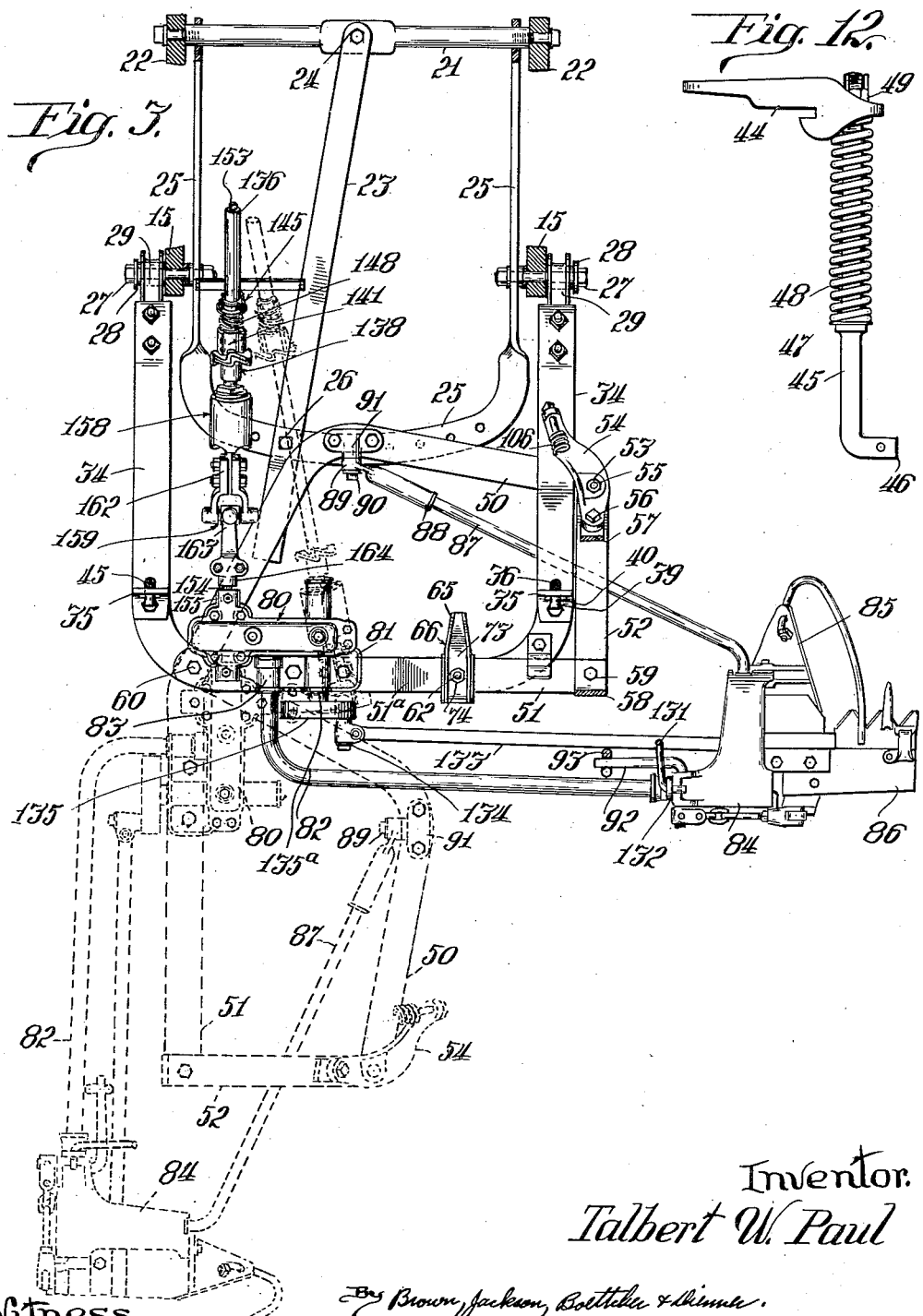

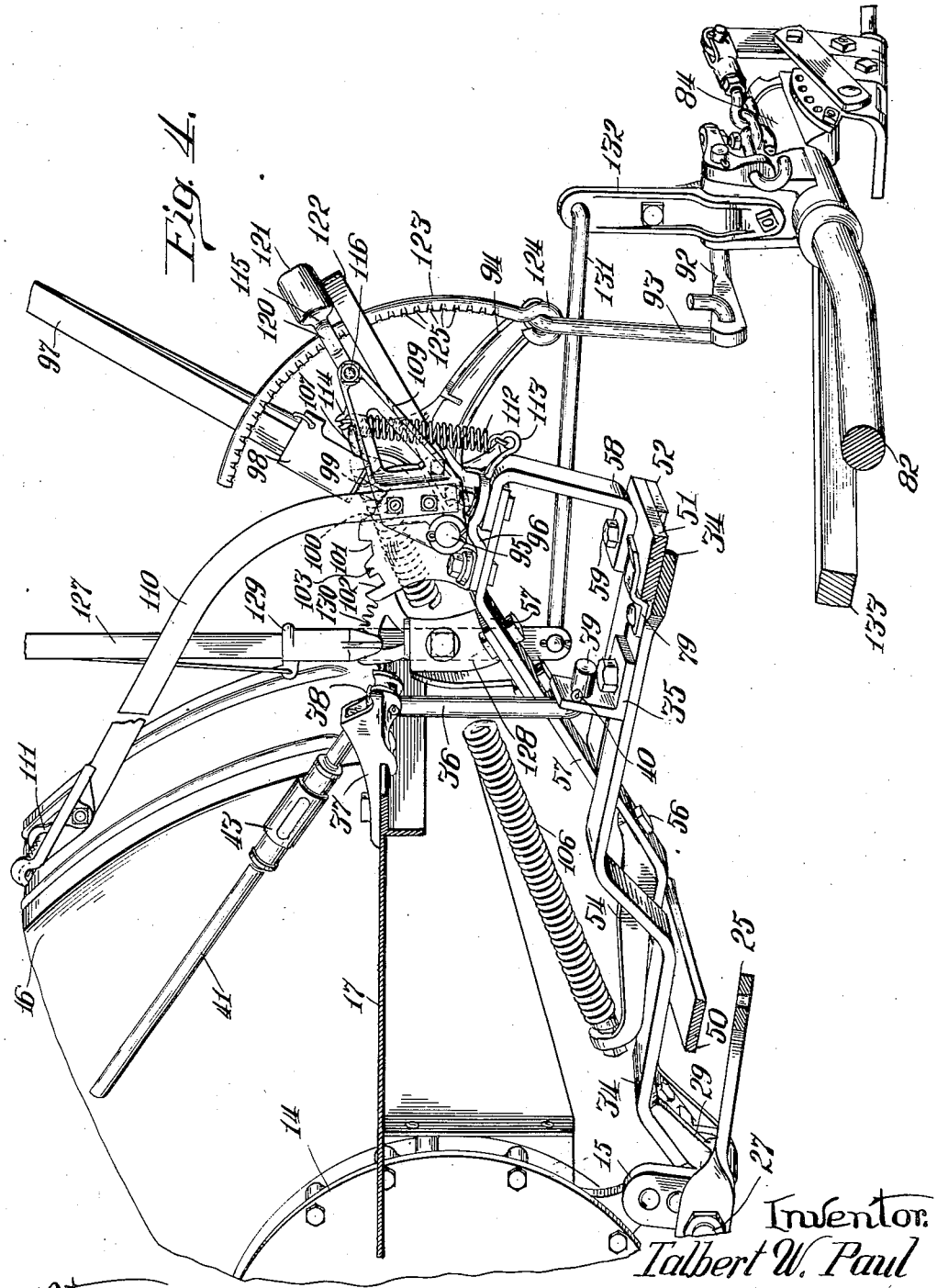

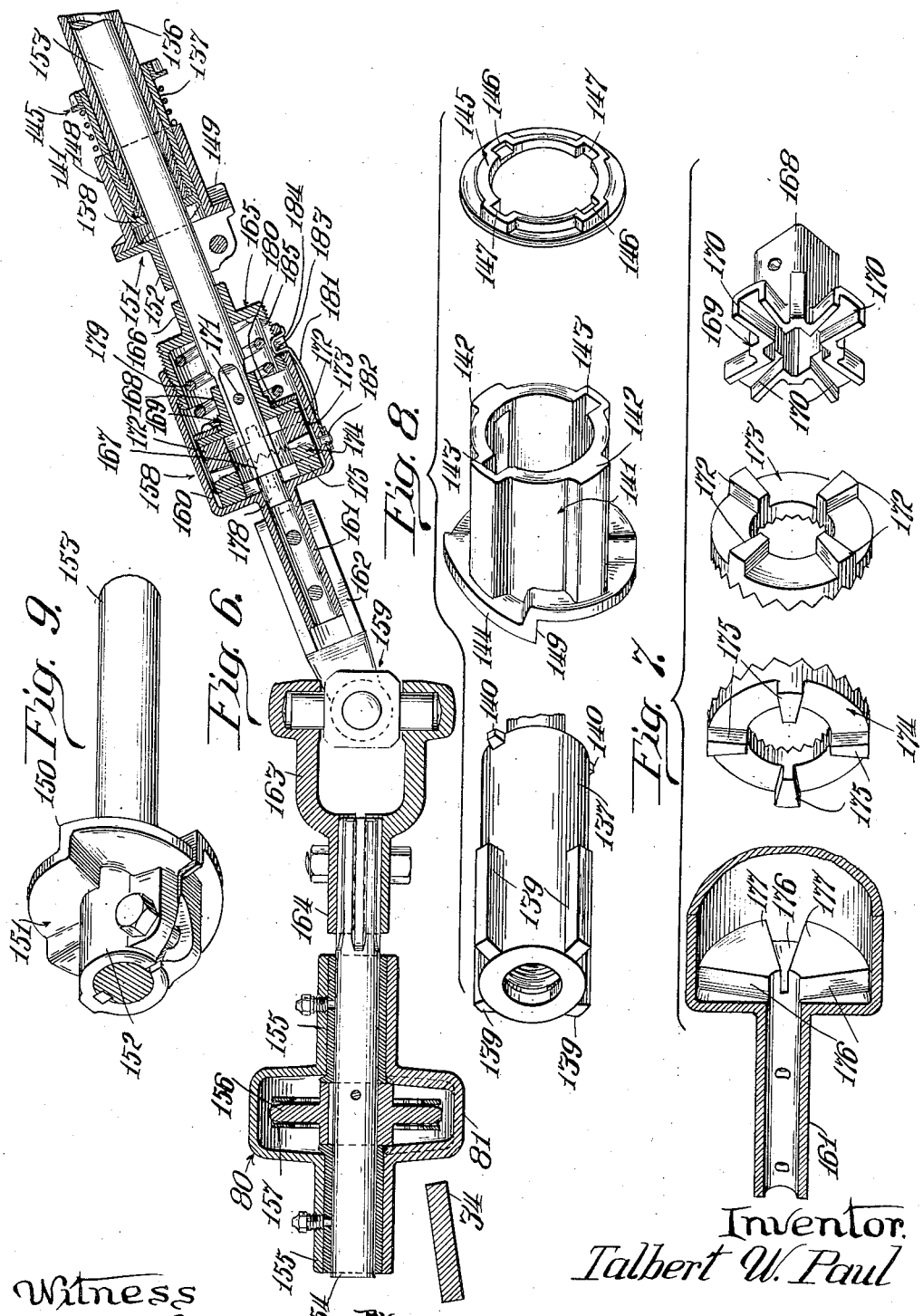

1,915,548

UNITED STATES PATENT OFFICE

TALBERT W. PAUL, OF MOLINE, ILLINOIS, ASSIGNOR TO DEERE & COMPANY, OF MOLINE, ILLINOIS, A CORPORATION OF ILLINOIS

MOWER

Application filed November 1, 1929. Serial No. 403,942.

This invention relates to mowing machines, and more particularly to a mower adopted to be drawn by and driven from a tractor.

Tractor mowers are, in general, known and in use but such mowers of this kind as I am familiar with, are open to several objections from a practical standpoint. In mowers of this type, there is liability of breakage of the mower proper due to encountering stumps, rocks and other obstructions. Also, if the mower be released so as to swing away from an obstruction the continued operation of the mower from the power take-off shaft of the tractor is a source of great danger to the operator. There is also the danger that, in disconnecting the mower from the tractor, or connecting it to the tractor, the operator might inadvertently throw the power take-off shaft of the tractor into operation and as a result be seriously injured.

A further objection to the present type of tractor mower is that, in the event of the tractor dropping into a hole or depression, the mower is apt to be broken or seriously damaged. Also, in tractor mowers, it is necessary, for practical considerations, to dispose the lift lever rearwardly of the operator's seat in such position that, in its rearmost position, it cannot be readily grasped.

I have found that by suitably mounting the mower on the tractor and connecting it to the power take-off shaft thereof in a novel manner, the above noted objections to the present type of tractor mower can be eliminated. I provide a main supporting frame suitably secured to the tractor and on this frame I pivot the mower frame in such manner as to facilitate swinging of the mower rearwardly out of contact with an obstruction. In order that the mower may be quickly released when it encounters an obstruction, I provide a novel means for releasably securing the mower frame to the main supporting frame. I also provide a special type of clutch for connecting the mower drive shaft to the tractor power take-off shaft in such manner that, when the mower is released and swung rearwardly or when the mower is being applied to the tractor, the driving connection between these two shafts will be disabled and will not be reestablished until the mower has been returned to its proper operative position relative to the main supporting frame.

This main frame is mounted on the tractor frame on an axis extending transversely thereof, and is so supported as to be capable of upward movement when the mower travels upon the ground or when the tractor sinks into a depression, thus avoiding breakage of or damage to the mower from either of these causes. A further and important object of my invention is to provide means whereby the cutter bar may be raised with facility to clear slight obstructions, without being raised into its lifted position, such means normally permitting free rise and fall of the cutter bar and being effective for raising the same whether the bar be in a depression or on a rise, that is, irrespective of the vertical position of the cutter bar relative to the means referred to at the time that such means is moved in bar raising direction. A further object is to provide means of the character stated for raising the bar to clear obstructions, this means being associated with a lift lever and cooperating therewith for raising the bar to either one of two of its lifted positions by a pump action or step by step movement. Further objects and advantages of my invention will appear from the detailed description.

In the drawings:

Fig. 1 is a side view of a mower, viewed from the cutter bar side, as applied to a tractor, the tractor being shown fragmentarily.

Fig. 2 is a plan view of the mower and the rearward portion of the tractor.

Fig. 3 is a section taken substantially on line 3—3 of Fig. 1.

Fig. 4 is a section taken substantially on the line 4—4 of Fig. 2.

Fig. 5 is a section on an enlarged scale, taken substantially on the line 5—5 of Fig. 2.

Fig. 6 is a sectional view through the tractor power take-off shaft and the connection between the same and the mower drive shaft, parts being shown in elevation.

Fig. 7 is a disassembled view of the slip clutch between the mower drive shaft and the transmission shaft.

Fig. 8 is a disassembled view of one of the members of the clutch between the power take-off shaft of the tractor and the transmission shaft.

Fig. 9 is a perspective view of a member of the clutch between the tractor power take-off shaft and the transmission shaft.

Fig. 10 is a detail of the guard for the tractor power take-off shaft.

Fig. 11 is an enlarged detail, partly in section and broken away, of the gripping arm associated with the foot pedal, and associated parts.

Fig. 12 is a detail of the means for supporting the left hand side of the main mower supporting frame from the tractor platform.

I have illustrated my mower as applied to a Tractor T of known type which comprises rear wheels 13, rear wheel housings 14, attaching lugs 15 suitably secured to and depending from the housings, fenders 16 extending over the wheels, and a platform 17 suitably secured to the tractor frame. An operator's seat 18 is mounted upon a standard 19 conveniently secured to the transmission housing 20. Referring more particularly to Fig. 3, a cross bar 21 is suitably secured to attaching lugs 22 formed integrally with and depending from the rear wheel housings 14 at the forward portions thereof. A draw bar 23 is pivotally secured at its forward end, at 24, to cross bar 21 centrally thereof. The draw bar 23 straddles bar 21 and also straddles the bight portion of a U-shaped draw frame 25 the forward ends of the arms of which are hung upon cross bar 21. The bight portion of frame 25 is of arcuate shape and concentric with pivot 24, and is provided with a series of openings for the reception of a bolt 26 which serves to secure the draw bar 23 to frame 25.

Bolts 27 are suitably secured through the arms of draw frame 25 and through the rearward attaching lugs 15. These bolts extend outwardly beyond the lugs and receive flanged bearing collars 28 fixedly mounted upon the bolts. A clamp member 29 extends upwardly over and about the upper portion of each of the collars 28, this member being provided with a lower jaw member 30 pivoted at 31 and secured in position about the lower portion of collar 28 by a bolt 32 which enters a slot in the forward end of member 29, a nut 33 being screwed upon this bolt. The clamp structure is, in general, of a known type and need not be illustrated or described in detail.

The clamp members 29 are suitably secured, as by bolting, to the forward ends of the arm of a U-shaped main supporting frame 34 of the mower. This frame extends rearwardly from the tractor and has its rearward portion off-set upwardly as will be noted more clearly from Figs. 1 and 4. The frame 34 is preferably formed of strap steel of suitable thickness and has a desirable resiliency. The main supporting frame of the mower is thus attached to the tractor for vertical swinging movement on a horizontal axis which is common to the bolts 27 and extends transversely of the tractor, the clamp structures turning upon collars 28.

The mower, when in operative position, extends a considerable distance to the right of frame 34, as will be noted more clearly from Fig. 2, so that the center of gravity of the mower is well beyond the right hand side of the main supporting frame therefor. This creates a tendency to twist the frame 34 transversely in such a manner as to depress the right hand side thereof and raise the left hand side. I take advantage of this tendency to provide supporting means for carrying the weight of the mower in such manner as to permit the same to rise relative to the tractor in the event that the mower frame encounters an abrupt rise or elevation or the tractor drops into a depression, thus preventing injury to the mower. Referring more particularly to Figs. 3 and 4, angle brackets 35 are secured to the arms of frame 34 adjacent the rearward end thereof. A tension link 36 is slidably mounted for vertical movement through a forked bracket 37 suitably secured to tractor platform 17, adjacent the right hand side thereof as viewed in Fig. 2.

This link is provided at its upper end with an enlarged head 38 which limits downward movement of the link through the bracket. The lower end portion of link 36 is bent to provide a finger 39 disposed at right angles thereto. This finger passes through the upwardly extending arm of the right hand angle bracket 35 and is held against withdrawal therefrom in a suitable manner, as by means of a cotter pin 40. In this manner the right hand arm of frame 34 is suspended from the platform structure of the tractor so as to have relative upward movement while also having a certain amount of movement about finger 39. A tension rod 41 is preferably provided to assist the bracket 37 in supporting the load of the mower. The rearward end of this rod is suitably secured to the bracket and the forward end of the rod is suitably secured, at 42, to the right hand fender 16 of the tractor. This rod is preferably provided with a turn buckle 43 of known type for properly tensioning it.

A bracket 44 is suitably secured to tractor platform 17 at the left hand side thereof. A link 45 is slidably mounted through this bracket for vertical movement, and is provided at its lower end with a finger 46 disposed substantially at right angle thereto and secured to the upward extending arm of the left hand bracket 35 in the same manner as finger 39 of link 36 is secured through its associated bracket 35. Link 45 is provided, adjacent its lower end, with a shoulder 47. An extension coiled spring 48 is mounted about the upward portion of said link and is confined between shoulder 47 and the under side of bracket 44.

An adjusting nut 49 screws onto the upper end of link 45 and bears against the upper face of bracket 44, this nut providing the means for adjusting the compression of spring 48. The spring provides means for exerting downward pressure upon the left hand side of frame 34 and constitutes cushion means for holding the mower frame in a level position. In the event that the mower frame strikes a sudden rise in the ground, or the tractor drops into a depression so as to bring the mower frame into contact with the ground, the spring 48 permits frame 34 to swing upwardly about the axis of bolts 27 thus avoiding damage or possible breakage of the mower. After the mower frame passes out of contact with the ground or the tractor passes out of the depression, the spring 48 acts to automatically return the mower frame to its proper position.

The mower is carried by a sub-frame which is suitably mounted upon the main supporting frame 34. This sub-frame comprises (Fig. 3) a forward member 50 of substantially V-shape in plan, a rearward member 51 and an end or side member 52. The left hand end of member 50, as viewed in Fig. 3, is disposed under frame 34 adjacent the rear left corner thereof and the right hand end of member 50 is suitably secured, as by means of a bolt 53 to the forward end of member 52, the forward portion of which is off-set downwardly, as in Fig. 1.

Bolt 53 also passes through a casting 54 and provides, in conjunction with nut 55, means for securing this casting to frame 34. A second bolt 56 passes through casting 54 and through member 52, this second bolt also passing through a member 57 of a supporting structure which also comprises a second member 58 of approximately L-shape the foot element of which seats upon the upper face of member 51 at the right hand end thereof as viewed in Fig. 3. A bolt 59 is secured through the foot element of member 58 and members 51 and 52 and serves to secure all of these members tightly together. The left hand end of member 51 is disposed above the rearward end of member 50 and at the upper face of frame 34, and a bolt 60 is suitably secured through the members 50 and 51 and the frame 34. This serves to secure the members 50 and 51 of the sub-frame together and also to provide a pivotal connection between the sub-frame and the main supporting frame 34, the sub-frame being turnable about the bolt 60 relative to frame 34 so as to be moved into and out of operating relation thereto.

The sub-frame, which carries the mower, is normally locked to the main supporting frame 34, with the member 51 disposed above the bight portion of this frame 34 and in substantial parallelism therewith, the cutter bar extending outwardly beyond the right hand side of the main supporting frame and substantially at right angles thereto, as in Figs. 2 and 3. In order that the bar may swing rearwardly to clear an obstruction which offers considerable resistance thereto, such as a stump or rock, I provide means for releasably locking the sub-frame to the main frame in operative relation thereto. Referring more particularly to Figs. 3 and 5, a channel shaped casting 61 is suitably secured, as by means of a cap screw 62, to frame 34 and seats against the under face thereof. This casting is disposed adjacent the right hand side of frame 34 as viewed in Fig. 3, and carries, at its forward end, a roller 63. At its rearward end the casting 61 is provided with a flange 64 the upper surface of which is inclined upwardly and forwardly towards frame 34 for cooperation with the similarly inclined forward surface of bill 65 of a hook member 66. This member 66 is loosely mounted about a pin 67 provided at its lower end with a reduced threaded stud 68 which screws into member 61 of the sub-frame. A bearing plate 69 is clamped between the body of pin 67 and member 61. This plate is shaped, at its rearward portion, to provide a channel element 70 which receives the finger 71 depending from member 66 and rockable in the channel element. Hook member 66 is urged downwardly by an expansion coil spring 72 mounted about pin 67 and confined between web element 73 of member 66 and a nut 74 which screws onto the upper end of the pin.

This nut provides convenient means for adjusting the compression of spring 72 so as to vary the pressure exerted on hook member 66 for holding the same in operative position, to suit conditions. Normally the hook member cooperates with roller 63 for locking the sub-frame to the main frame 34 in such manner as to effectively prevent release of the sub-frame and rearward movement thereof, under normal operating conditions. Forward movement of the sub-frame beyond its normal position of Fig. 3 is prevented by a clip 79 suitably secured to the right hand rear corner of frame 34 and so disposed to provide a positive stop for limiting forward movement of the sub-frame. The sub-frame is thus effectively held in operating position. In the event that the cutter bar or shoe of the mower encounters an object which offers unusual resistance thereto such as would be apt to cause injury to the mower, the resulting rearward pressure exerted upon the bill 65 of member 66 causes upward movement of this member so as to disengage the same from the roller 63 thus releasing the sub-frame which is then free to swing rearwardly into the extreme dotted line position of Fig. 3, or into an intermediate position, so as to clear the obstruction. After the obstruction has been cleared, the mower can readily be restored to operating position by swinging the sub-frame about pivot 60 so as to return it to its normal position. As the sub-frame approaches its normal position the inclined surface of bill 65 of member 66 contacts the upper surface of flange 64 of casting 61 so as to raise the bill 65 which then passes across the bight portion of frame 34 over roller 63, the spring 72 causing the bill 65 to engage about the roller.

In this connection, it is to be noted that the surface of the bill which contacts the roller 63 is so inclined as to urge member 61 forwardly into contact with clip 79. This is advantageous as providing simple and efficient means for holding the member 61 against undesirable looseness or play relative to frame 34.

As will be noted more clearly from Fig. 1, the right hand arm of frame 34, as considered in Fig. 3, has its rearward portion off-set upwardly so as to be disposed at a higher level than the rearward portion of the left hand arm of this frame, and the bight portion of frame 34 is bent upwardly at a portion intermediate in length to provide an upwardly extending element 34a which connects the right hand portion of the bight of frame 34, which extends substantially in the plane of the right hand arm of this frame, to the left hand portion of the bight of the frame, such left hand portion being disposed substantially in the plane of the left hand arm of the frame. Member 61 of the sub-frame is similarly bent at 51a, so as to properly seat upon the bight element of frame 34. A transmission housing 80, comprising a lower section and an upper section removably secured thereto, is disposed adjacent the left hand side of main frame 34, as viewed in Fig. 3. This housing is, in general, of known construction and is secured to member 61 of the sub-frame by a bracket element 81 bolted or otherwise suitably secured to member 51, this bracket being preferably cast integral with the lower section of the transmission housing and such housing being so disposed as to clear the bight element of frame 34 in the movement of the sub-frame on the pivot 60.

A drag bar 82, of approximate L-shape, is pivotally mounted at its inner end in a bearing sleeve 83 carried by the lower section of the transmission housing. The bar is held against endwise movement in sleeve 83 in a suitable manner, while being free to turn in this sleeve. The outer end of drag bar 82 is suitably connected to shoe head 84 of the cutting mechanism. This mechanism is, in general, of known type and comprises the head 84, shoe 85, cutter bar 86 and associated parts. The cutting mechanism need not be illustrated or described in detail, it being sufficient to note that such a mechanism which is, in general, of known type, is provided. Head 84 is also connected by a tension rod 87, socket member 88 secured on the forward end of rod 87, and collar 89 carried by the socket member, to a bearing stud 90 carried by a bracket 91 bolted or otherwise suitably secured to member 50 of the sub-frame. The drag bar 82 and the tension bar 87 provide simple and efficient means for attaching the shoe head 84 to the sub-frame while permitting rise and fall, as well as lifting and lowering of the cutter bar.

As more clearly illustrated in Figs. 1 and 4, an angular arm 92 is suitably secured to shoe head 84 and extends inwardly therefrom substantially parallel to drag bar 82. A link 93 has its lower end portion hooked through the inner end of arm 92 and is pivotally secured, at its upper end, to the rearward end of an arm 94. The arm 94 is loosely mounted for rocking movement upon a shaft 95 mounted in a bracket 96 suitably secured, as by bolting, to the supporting structure formed by the members 57 and 58.

A lift lever 97 is also loosely mounted upon shaft 95 adjacent arm 94. This lever has associated with it a latch 98 carrying a detent 99 which coacts with notches 100, 101 and 102 formed in the upper edge of a segment 103 carried by bracket 96 and conveniently formed integrally therewith. The lever 97 is provided at its lower end, with an angularly disposed finger 104 disposed to contact a lug 105 formed integrally with arm 94 and extending downwardly therefrom. The finger 104 is normally spaced a short distance away from lug 105 when lever 97 is in its rearmost position so as to accommodate slight rocking movement of arm 94 to permit rise and fall of the cutter bar without interference by the lift lever, as will be more fully explained. In the rearmost position of lever 97, the detent 99 engages into notch 100 of the segment 103 so as to support the weight of the shoe head 84 and associated parts when the cutter bar is in full lowered position. To assist in lifting the cutting bar and associated parts, a tension lifting spring 106 is suitably secured at its forward end to casting 54, and has its rearward end hooked through a hook element 107 of a finger 108 extending upwardly from arm 94. The detent 99 and the notches 100 and 102 of the segment 103 are so related that the lever 97 can be moved from the position of Fig. 1 into an intermediate position in a clockwise direction as considered in Fig. 1. This relation between the detent and the notches of the segment is known in the art and need not be illustrated nor described in detail, it being sufficient to note that the lift lever can be moved from its rearmost position to its foremost position without the necessity of manually operating the latch 98, it being understood that the detent 99 cooperates with the shoulders of notches 101 and 102 to hold the lever against rearward movement.

When the detent engages into notch 101 the cutter bar is held in one lifted position, and when the detent engages into notch 102 the cutter bar is held in its full lifted position. The latch 98 is operated by means of a handle and a connecting rod on the lever, as well understood in the art, and the means for operating the latch need not be illustrated or described in detail. Arm 94, being free from this lever, the cutter bar can move upwardly independently of the lever, as conditions may require.

An arm 109 is mounted for turning on shaft 95 at the opposite side of segment 103 to lever 97. A foot lever 110 is suitably secured to this arm for turning the same in a counterclockwise direction, as considered in Fig. 4, on the axis of shaft 95 when the forward end of lever 110 is depressed. This lever 110 extends upwardly and forwardly from shaft 95 and is preferably provided, at its forward end, with a foot plate 111 suitably secured thereon. Arm 109 is urged in a clockwise direction, as viewed in Fig. 4, by a tension spring 112 secured at its lower end to an eye 113 of bracket 96, the upper end of this spring being hooked through an element 114 of arm 109. A gripping arm 115 is pivotally secured at its forward end, at 116, to the rearward end of arm 109. As will be noted more clearly from Fig. 11, arm 115 is loosely mounted upon a reduced portion 117a of a sleeve 117 which is fixedly mounted upon pivot bolt 116.

Arm 115 extends forwardly a short distance beyond bolt 116 and arm 109 is provided with a laterally projecting lug 118 disposed to contact portion 119 of arm 115 to limit turning thereof in a counterclockwise direction as viewed in Fig. 4, on the axis of bolt 116. This is shown more clearly in Fig. 1. Arm 115 is enlarged, beyond sleeve 117, to provide an eye 120, and has its rearward portion considerably enlarged to provide a weight element 121 of proper value to rock arm 115 in a clockwise direction, as viewed in Fig. 4, upon movement of arm 109 in a counterclockwise direction as viewed in this figure.

When arm 109 is in its normal position, weight element 121 contacts the horizontal arm of an L-shaped stop member 122, conveniently formed of strap steel, which is secured to bracket 96. Continued rearward movement of arm 109, after weight element 121 contacts stop 122 serves to bring element 119 into contact with lug 118, thus limiting rearward movement of arm 109 under the influence of tension spring 112. At this time arm 115 is disposed radially of shaft 95, as is arm 109, as in Fig. 1. This disposes eye 120 of arm 115 for permitting free sliding movement therethrough of an arcuate lift bar 123. This bar is connected, at its lower end, by eye 124 to the upper end of link 93. With the parts in the relative position of Fig. 4, bar 123 is concentric with shaft 95. The forward portion of this bar is provided with a plurality of notches 125. Normally the bar 123 is freely slidable through eye 115 so as to accommodate rise and fall of the cutter bar. Upon depression of foot pedal 110, arm 109 will move forwardly a short distance independently of arm 115, due to the pivotal connection 116, after which bar 123 is gripped by the opposite walls of eye 115 and the shoe head and cutter bar and associated parts are then raised in the continued movement of the foot lever.

It is to be particularly noted that this gripping action of eye 115 on the bar 123 is effective irrespective of the vertical position of the cutter bar relative to the foot lever. The foot lever and associated parts are particularly adapted for raising the cutter bar a short distance for clearing slight obstructions without lifting it to inoperative position. Preferably the normal movement of the foot lever is such that the cutter bar will be raised a distance less than the distance it would be lifted by movement of the lift lever 97 to its forward position. A great advantage of the foot lever and associated parts is the bar will be raised a certain definite distance when the foot lever is depressed to a predetermined extent, whether the cutter bar be in a depression or on a rise at the time the foot lever is depressed. Furthermore, the fact that the foot lever and associated parts do not in any way interfere with the rise and fall of the cutter bar when the foot lever is in normal position, is highly advantageous and an important feature of my invention.

Referring more particularly to Figs. 1 and 11, sleeve 117 extends across latch 98 of lever 97 rearwardly thereof, and is disposed to contact a rearwardly projecting element 126 of this latch upon forward movement of arm 109. Upon depression of the foot lever, the bar 123 is gripped by the eye of arm 115 so as to raise the cutter bar, as previously described, and sleeve 117 contacts element 126 thus moving the lever 97 forwardly.

Under ordinary conditions, this movement of the lever is not sufficient to bring the detent 99 into position in front of the shoulder of notch 101 so that, upon release of the foot lever, the cutter bar returns to its lowered position.

The foot lever is also intended, however, to be used in lifting the cutter bar. In this connection, it is to be noted that when the foot lever is depressed the forward movement of lever 97 is such as to dispose this lever in position to be readily grasped by the operator upon the seat 18. By depressing the foot lever 110 to its full extent it is possible to lift the cutter bar into either of its lifted positions with a step by step movement and without having to apply lifting force through the lift lever 97. That is to say, by depressing the lever 110 to its full extent, the cutter bar is raised into its first lifted position, whereupon the lever 97 may be moved forwardly sufficiently and without having to exert any lifting force through this lever to cause the detent to engage into notch 101, after which the foot lever is released and is returned to normal position, causing eye 120 of arm 115 to again grip bar 123. By depressing the foot lever a second time, the cutter bar is raised to its second lifted position, whereupon the lever 97 may be moved into its most forward position, without having to apply lifting force through this lever. The operator may also lift the cutter bar by the use of the lift lever alone, or by applying lifting force to both the hand lever and the foot lever simultaneously.

Shoe head 84 is mounted for turning movement on the drag bar 82, the connection between head 84 and tension bar 87 being of a known type to permit this movement of the shoe head. A tilting lever 127 is suitably mounted upon a bracket 128 bolted, or otherwise suitably secured to supporting member 57. This lever carries a latch 129, operated in a known manner, this latch cooperating with a rack 130, carried by bracket 128, for securing lever 127 in adjustment. Lever 127 is connected, at its lower end, by a link 131 to the upper end of an arm 132 suitably secured to shoe head 84. The tilting lever and associated parts provide means for tilting the cutter bar on a horizontal axis, as is known in the art. The function and operation of this lever is well known in the art and need not be illustrated or described in detail.

The cutter bar 86 is reciprocated in a known manner by means of the pitman rod 133 suitably connected thereto at one end, the other end of this pitman rod being eccentrically connected at 134 to flywheel 135 which is driven, from a drive shaft, through a suitable transmission of known type mounted in the housing 80. The mower drive shaft is driven, through the medium of a transmission shaft and a universal joint, from a power take-off shaft of the tractor, there being a disconnect clutch, between the power take-off shaft and the transmission shaft, of special construction which acts to disconnect the power from the mower when it is swung rearwardly out of operative position, and to connect the power to the mower when it is returned to such position.

Referring more particularly to Figs. 3 and 6, the tractor is provided with a tubular power take-off shaft 136, in a known manner. A sleeve 137, provided at its lower end with an inwardly extending flange 138, is screwed upon the rearward end of tubular shaft 136. This sleeve is provided, on its outer surface, with four radially projecting ribs 139, these ribs extending lengthwise of the sleeve from the lower end thereof and being equally spaced. At its upper end, sleeve 137 is provided with two radially projecting lugs 140 spaced 180° apart and in alignment with two of the ribs 139. A collar 141 is mounted about the lower portion of sleeve 137 and is provided with longitudinally extending channel elements 142 and 143 arranged in pairs and spaced apart 90° around collar 141. These channel elements all open at one end through a flange 144 at the lower end of collar 141. Elements 143 are open at their upper ends and elements 142 are closed at their upper ends, as illustrated. These channel elements receive the ribs 139 of sleeve 137 and coact therewith to establish driving connection between the sleeve and the collar which is thus driven from shaft 136. A locking ring 145 is mounted about the upper end of sleeve 137 and is held against upward movement thereon by the lugs 140 which engage into recesses 146 in the upper face of the ring. The ring is further provided with slots 147 which accommodate the lugs 140 in applying the ring to the sleeve.

An expansion coil spring 148 is mounted about the upper portion of sleeve 137 and is confined between ring 145 and the upper end of collar 141. This spring urges the collar downwardly along sleeve 137. In this connection, it is to be noted that the closed upper ends of channel elements 142 of the collar 141 serve to prevent passage of the collar off of the lower end of sleeve 137 under the influence of spring 148. In assembling the sleeve 137 and associated parts, collar 141 is slid onto the sleeve with the lugs entering channel elements 143, the ribs 139 in alignment with the lugs then entering the channel elements, the other two ribs entering the channel elements 142. Spring 148 is then positioned about the upper portion of sleeve 137 and ring 145 is turned into position to bring lugs 140 into alignment with slots 147 and is then passed over the lugs onto the sleeve, the spring 148 being under compression, and is turned 90° and then released so that the lugs 140 enter recesses 146, the pressure exerted by spring 148 on the under face of ring 145 being amply sufficient to hold the ring in its outer or upper position.

Flange 144 is shaped to provide a plurality of uni-directional teeth 149. These teeth cooperate with similar teeth 150 of a flange 151 at the upper end of split collar 152 which is clamped about and keyed to a transmission shaft 153 the upper portion of which is of circular cross section and telescopes the tubular power take-off shaft 136. The clutch teeth 150 are directed oppositely to teeth 149, the teeth of the two clutch elements being so related that transmission shaft 153 is driven in a counterclockwise direction, as considered in Fig. 3, from the power take-off shaft 136, this being the normal direction of rotation of shaft 136.

Drive shaft 154 of the mower is rotatably mounted in bearing sleeves 155 of transmission housing 80. A sprocket wheel 156 is pinned upon shaft 154 and has driving connection, as by means of a sprocket chain 157, to shaft 135a on which the flywheel 135 is keyed, it being understood that a sprocket wheel is keyed on this shaft and disposed within housing 80 in the same manner as sprocket wheel 156. Any other suitable or preferred type of drive between shafts 154 and 135a may be provided. Shaft 154 is driven from transmission shaft 153 through a slip clutch 158 and a universal joint 159. The slip clutch is of known type and comprises a cylindrical casing 160 having a reduced neck 161 extending from its lower end, axially thereof, this neck being pinned or otherwise suitably secured in one member 162 of the universal joint. The other member 163 of this joint is provided with a split sleeve 164 which is splined upon the forward end of shaft 154 and is tightly clamped about this shaft. Casing 160 screws, at its upper end, onto a head 165 having a collar 166 mounted loosely upon shaft 153. The lower portion of this shaft is squared, at 167, and receives squared neck 168 of a cruci-form head 169 comprising the channel elements 170. Neck 168 is secured to portion 167 of shaft 163 by a pin 171, or in any other suitable manner. Referring more particularly to Fig. 7, the channel arms 170 of head 169 receive lugs 172 on the upper face of a clutch ring 173 having V-shaped teeth on its under face.

The teeth of ring 173 engage with corresponding teeth on the upper face of a similar ring 174 having lugs 175 on its under face, which lugs engage into slots 176 defined by segments 177 formed integrally with or otherwise suitably secured to the lower wall of casing 160. The lower end of shaft 153 is preferably rounded to provide a centering stud 178 which enters the upper end of neck 161 and coacts with collar 166 to properly align the elements of the slip clutch. An expansion coiled spring 179 is disposed within casing 160 and head 165 thereof, and is confined between the head and a pressure ring 180 seating upon the upper face of head 169. A leaf spring 181 is secured at its lower end, at 182, to casing 160 adjacent the lower end thereof and has its upper end portion bent to provide a detent 183 which operates through a slot 184 in casing 160. Head 165 is provided with an elongated slot 185 adapted for reception of detent 183 for locking the head and the casing together. Obviously, any desired number of slots may be provided in the head and any other suitable or equivalent means may be employed for locking the head and the casing of the slip clutch together. By screwing the casing 160 onto or off of head 165 or, more correctly, screwing the head into or out of the casing, the compression of spring 179 can be varied to suit operating conditions. The slip clutch acts in a known manner to permit slippage between transmission shaft 153 and the mower drive shaft 154 when the teeth of the cutter bar encounter unusual or dangerously high resistance. Under ordinary conditions, the slip clutch does not operate and the cutter bar is driven from the transmission shaft by the mower drive shaft 154.

When the cutter bar is in its normal operating position, with the sub-frame releasably locked to the main supporting frame 34, as in Fig. 3, the clutch teeth 149 of collar 141 are in operating engagement with teeth 150 of collar 152 so that the transmission shaft 153 is driven from the power take-off shaft 136 of the tractor. In the event that the cutter bar encounters an obstruction which offers sufficient resistance to release the sub-frame from the main frame, the sub-frame swings rearwardly so that the cutter bar clears the obstruction, as previously described. This rearward swinging movement of the sub-frame about the pivot 60 withdraws transmission shaft 153 from shaft 136 sufficiently to disengage the elements of the clutch thus disabling the drive between these two shafts so that the cutter bar is no longer driven. As soon as the obstruction has been cleared, the operator swings the cutter bar back into its operative position, the driving connection between shafts 136 and 153 being automatically reestablished when the sub-frame has been returned to its normal position. This is a decided practical advantage as the operator is not under the necessity of disestablishing and reestablishing driving connection between the power take-off shaft and the transmission shaft. Under ordinary conditions, the cutter bar does not swing rearwardly to its extreme position indicated by dotted lines in Fig. 3. In practice, the transmission shaft 153 is approximately 18 inches long and it is possible that this shaft may be completely withdrawn from the power take-off shaft 136 under certain unfavorable conditions.

This may occur, for instance, if the cutter bar encounters an obstruction when making a turn and the operator is unable or fails to stop before completing the turn. The sub-frame may then swing to the extreme position indicated in Fig. 3, thus completely withdrawing the transmission shaft from the power take-off shaft. To prevent possible injury to the operator or the tractor when this occurs, I prefer to provide a guard about the power take-off shaft. This guard is conveniently in the form of a rectangular frame 186 formed of strap steel and suitably secured to the platform 17 of the tractor, this frame extending about shaft 136 in advance of the clutch member associated therewith. The transmission shaft 153 may be of sufficient length to be not completely withdrawn from the power take-off shaft in any position of the sub-frame. However, even under such conditions, I prefer to provide the guard 186 as there is the possibility that the operator, after removing the mower from the tractor might inadvertently start the tractor without having removed the power take-off shaft.

What I claim is:

1. In a mowing machine, a frame, a cutter bar mounted on the frame for relative vertical movement, a foot lever on the frame, and operating connections between the lever and the bar for lifting the latter, said connections including normally released parts permitting independent rise and fall of the bar when lowered and acting when said parts are engaged to raise the bar a given distance when the lever is moved a predetermined distance in bar raising direction and irrespective of the vertical position of the bar relative to said lever.

2. In a mowing machine, a frame, a cutter bar mounted on the frame for relative vertical movement, a foot lever on the frame, and operating connections between the lever and the bar for raising the latter, said connections comprising relatively movable releasable parts engageable in different relative positions and acting when released to permit lifting and lowering of the bar independently of the lever and acting when engaged to raise the bar a given distance when the lever is moved a predetermined distance in bar raising direction and irrespective of the vertical position of the bar relative to said lever.

3. In a mowing machine, a frame, a cutter bar mounted on the frame for relative vertical movement, a foot lever on the frame, a lifting bar connected to the cutter bar, and a gripping member operated by the lever and receiving said lifting bar, the lifting bar being freely slidable through said member in the normal position of the latter and the gripping member acting to grip the lifting bar as the lever is moved in cutter bar lifting direction for lifting said cutter bar during continued movement of the lever in such direction.

4. In a mowing machine, a frame, a cutter bar mounted on the frame for relative vertical movement, a foot lever on the frame, a lifting bar connected to the cutter bar, a gripping member connected to the lever for movement therewith and receiving the lifting bar, and means for holding the gripping member in inoperative position when the lever is in normal position, said lifting bar being freely slidable through the gripping member when the latter is in inoperative position, said gripping member acting to grip the lifting bar as the lever is moved in cutter bar lifting direction for lifting said cutter bar during continued movement of the lever in such direction.

5. In a mowing machine, a frame, a cutter bar mounted on the frame for relative vertical movement, a foot lever, lost motion connection between said lever and the bar for lifting the latter a given distance when the foot lever is moved in bar lifting direction and irrespective of the vertical position of the bar relative to said lever, said connection permitting rise and fall of the bar, when lowered, independently of the lever, and means cooperating with said connection and operable independently of the lever for lifting and lowering the bar and for holding it in lifted position.

6. In a mowing machine, a frame, a cutter bar mounted on the frame for relative vertical movement, a hand lift lever, a foot lift lever, means for holding the hand lever in adjustment, connections between the hand lever and the bar for lifting and lowering the latter, said connections permitting independent rise and fall of the cutter bar when lowered, and supplemental connections between the foot lever and the bar permitting independent rise and fall of the bar when lowered, said supplemental connections acting to lift the bar when the foot lever is moved in bar lifting direction.

7. In a mowing machine, a frame, a cutter bar mounted on the frame for vertical movement, a lift lever, connections between the lever and the cutter bar for supporting the cutter bar and for raising and lowering it, means for securing the lever in adjustment to hold the cutter bar raised, a foot lever, and supplemental connections between the foot lever and the cutter bar for raising the latter a given distance when the foot lever is moved a predetermined distance in bar raising direction, said supplemental connections permitting rise and fall of the cutter bar independently of the foot lever.

8. In a mowing machine, a frame, a cutter bar mounted on the frame for relative vertical movement, a lift lever on the frame, means for securing the lever in adjustment, connections between the lever and the cutter bar for lifting and lowering the same, said connections permitting rise and fall of the cutter bar when lowered independently of the lever, a foot lever on the frame, and supplemental connections between the foot lever and the cutter bar for raising the latter a given distance irrespective of the vertical position of the cutter bar relative to the foot lever when said foot lever is moved a predetermined distance in bar raising direction, said supplemental connections permitting rise and fall of the cutter bar independently of the foot lever and also permitting lifting and lowering of the cutter bar independently of the foot lever.

9. In a mowing machine, a frame, a cutter bar mounted on the frame for vertical movement relative thereto, a lift lever on the frame, means for securing the lever in adjustment for holding the bar raised while permitting free movement of the lever in bar raising direction, connections between the lift lever and the cutter bar for lifting and lowering the latter, said connections permitting lifting of the cutter bar independently of the lever, a foot lever on the frame, supplemental connections between the foot lever and the cutter bar for raising the latter a given distance irrespective of the vertical position of the cutter bar relative to the foot lever when the foot lever is moved a predetermined distance in bar raising direction, said supplemental connections permitting rise and fall of the cutter bar and lifting and lowering thereof independently of the foot lever, and means actuated by the foot lever when moved in bar raising direction for moving the lift lever in bar lifting direction.

10. In a mowing machine, a frame, a cutter bar mounted on the frame for relative vertical movement, a shaft, an arm mounted for rocking movement on the shaft, a link connecting the arm and the cutter bar, a second arm mounted on the shaft for rocking movement, a foot lever secured to the second arm, yielding means for holding said second arm in normal position, a gripping arm pivoted on the second arm and provided with an eye, an arcuate lift bar pivoted to the link and extending through said eye, the lift bar being freely slidable through the eye of the gripping arm when the latter is in normal position, means for holding the gripping arm in normal position when said second arm is in normal position, the gripping arm having movement oppositely to the movement of the second arm when the foot lever is moved in bar raising direction, and means for limiting reverse turning movement of the gripping arm relative to the foot lever arm as the latter is returned to normal position.

11. In a mowing machine, a frame, a cutter bar mounted on the frame for relative vertical movement, a shaft on the frame, an arm rockably mounted on the shaft, a link connecting the arm and the cutter bar structure, a lift lever rockably mounted on the shaft, means for securing the lever in adjustment to hold the bar raised while permitting free movement thereof in bar raising direction, a foot lever arm mounted on the shaft, a foot lever secured on the foot lever arm, a gripping arm pivoted on the foot lever arm and provided with an eye, an arcuate lift bar pivoted to the link and passing through said eye, yielding means for normally holding the foot lever arm in normal position, means for limiting movement of the foot lever arm in its return movement to normal position and for returning the gripping arm to normal position, said lifting bar being freely slidable through the eye of the gripping arm when the latter is in normal position, cooperating means carried by the lift lever and the foot lever arm for moving the lift lever in bar lifting direction when the foot lever is moved in bar raising direction a predetermined extent, and cooperating means carried by the lever and the first mentioned arm for moving the latter in bar lifting direction when the lift lever is moved in such direction, the last mentioned means permitting rise and fall of the cutter bar when in its lowered position independently of the lift lever.

12. In combination, a tractor having a power take-off shaft, a main supporting frame attached to the tractor, a supplemental frame pivoted on the main frame on a vertical axis, a cutter bar structure carried by the supplemental frame and projecting to one side of the main frame in the normal position of said supplemental frame, means for releasably locking the supplemental frame to the main frame in normal relation thereto, the cutter bar structure including a cutter bar, and driving connections between the cutter bar and the tractor power take-off shaft, said connections being adapted to be disabled when the supplemental frame is released from the main frame and including means maintaining said connections in operative re'ation with one another when the supplemental frame is released whereby said connections are automatically restored when the supplemental frame is returned to its normal operative position relative to the main frame.

13. In combination, a tractor having a power take-off shaft, a main supporting frame attached to the tractor, a supplemental frame pivoted to the main frame on a vertical axis, a mower including a cutter bar mounted on the supplemental frame, the cutter bar projecting to one side of the main frame in the normal position of the supplemental frame, locking means releasably securing the supplemental frame to the main frame in normal relation thereto and acting to release the supplemental frame to permit rearward swinging movement thereof when subjected to excessive pressure due to the cutter bar encountering an obstruction, and driving connections between the cutter bar and the tractor power take-off shaft, said driving connections including a clutch comprising clutch elements in operating engagement in the normal position of the supplemental frame and moved out of operative engagement when the supplemental frame is swung rearwardly out of its normal position.

14. In combination, a tractor having a power take-off shaft, a main mower supporting frame attached to the tractor, a supplemental frame pivoted on a vertical axis to the main frame, a mower drive shaft eccentric to the pivot of the supplemental frame and carried thereby, driving connections between said drive shaft and the cutter bar, a transmission shaft having driving connection with the mower shaft and telescoping the tractor power take-off shaft, a clutch member secured to the power take-off shaft, a clutch member secured to the transmission shaft, said clutch members establishing driving connection between the power take-off shaft and the transmission shaft when the supplemental frame is in its normal position relative to the main frame, and locking means for releasably securing the supplemental frame to the main frame in its normal relation thereto, the cutter bar extending to one side of the main frame when the supplemental frame is in normal position and the locking means being adapted to yield under excessive pressure applied thereto due to the cutter bar encountering an obstruction so as to release the supplemental frame and permit rearward swinging thereof to enable the cutter bar to clear such obstruction, this rearward swinging movement of the supplemental frame disengaging the clutch members but not withdrawing the transmission shaft from the power take-off shaft.

15. In combination, a tractor, a main mower supporting frame attached to the tractor, a supplemental frame pivoted on the main frame on a vertical axis, a mower carried by the supplemental frame and including a cutter bar projecting to one side of the main frame when the supplemental frame is in its normal position, means for releasably locking the supplemental frame to the main frame in normal relation thereto, said means being adapted to be released by excessive pressure applied thereto due to the cutter bar encountering an obstruction so as to permit rearward swinging movement of the cutter bar, a mower drive shaft carried by the supplemental frame eccentric to the pivot thereof, said tractor having a tubular power take-off shaft, a transmission shaft having driving connection with the forward end of the mower shaft and telescoping into the tractor shaft, a clutch member secured to the transmission shaft, a second clutch member mounted on and driven by the power take-off shaft, and yielding means for holding the second clutch member in operative relation to the first clutch member when the supplemental frame is in normal position, the transmission shaft being shifted relative to the power take-off shaft to disengage the clutch members when the supplemental frame is released and swung rearwardly.

16. In combination, a tractor, a mower supporting frame attached at its forward end to the tractor for swinging movement on a horizontal axis, links connecting the rearward portion of the frame to the tractor and limiting downward movement of the frame, said links having shiftable connection with the tractor to provide for limited upward movement of the frame relative to the tractor without disconnecting said links therefrom, and a mower carried by said frame.

17. In combination, a tractor, a cross-bar secured to the tractor, a draw-frame attached to the cross-bar, a draw-bar connecting the cross-bar and the frame, attaching lugs carried by the tractor and secured to the draw frame, a mower supporting frame pivotally connected to the lugs and the draw frame on a horizontal axis, means for supporting the rearward portion of said frame from the tractor while permitting relative upward movement of the frame, and a mower carried by said frame.

18. In combination, a tractor, a main mower supporting frame attached to the tractor, a mower mounted on the supporting frame and normally projecting to one side thereof, means for suspending said frame at the mower side thereof from the tractor, and cushioning means reacting directly against the tractor for exerting downward pressure upon the frame at the other side thereof.

19. In combination, a tractor, a mower supporting frame attached to the tractor, a mower mounted on the frame and normally projecting to one side thereof, a suspension connection between the tractor and said side of the frame, said connection permitting relative vertical movement of the frame, and a connection between the tractor and the other side of the frame and including yielding means reacting directly against the tractor exerting downward pressure upon the frame at said other side thereof and permitting relative vertical movement of said frame.

20. A mowing machine comprising a frame, a cutter bar mounted on the frame for relative vertical movement, a lever on the frame, and operating connections between the lever and the cutter bar for raising the latter, said connections comprising a pair of interengaging relatively movable members, one connected with said cutter bar and the other connected with said lever, said members being movable to two relative positions, one in which said members are engaged whereby operation of the lever will raise the cutter bar and the second position being one in which said members are disengaged whereby the member connected with the cutter bar can move relative to the other member and the associated lever.

21. In combination, a tractor having a power take-off shaft, a mower supporting frame connected with the tractor for movement about a vertical axis, means including a shaft for driving the mower, and means normally connecting said shafts at all times including releasable clutch means adapted to be released by rearward movement of the mower supporting frame about its vertical axis.

22. In combination, a tractor having a power take-off shaft, a mower supporting frame connected with the tractor for swinging movement about a vertical axis, a shaft for driving the mower, and means connecting the shafts including clutch means adapted to overrun when the mower is subjected to an overload and releasable and separable parts connected respectively with the tractor and the mower supporting frame whereby said parts are adapted to be disengaged when the mower supporting frame is swung about its axis.

23. In combination, a tractor having a power take-off shaft, a mower supporting frame connected with the tractor for rearward swinging movement about a vertical pivot, a mower carried by said frame and including a mower drive shaft disposed eccentrically with respect to the pivot of said frame, and driving connections between the tractor, take-off shaft and the drive shaft of the mower, said connections comprising telescoping parts, one connected with the power take-off shaft and the other connected with the mower drive shaft, and interengaging clutch members, one carried by one of said telescoping parts and the other carried by the other telescoping part, whereby upon rearward swinging movement of the mower supporting frame said clutch members will be separated to thereby interrupt the drive from the power take-off shaft to the mower.

24. In combination, a tractor having a power take-off, a mower supporting frame connected to the tractor for swinging movement about a vertical axis, a mower including a cutter bar carried by said frame, means including a mower drive shaft for driving said cutter bar, a pair of telescoping shafts connected, respectively, with said power take-off shaft and said mower drive shaft for relative axial movement when the mower supporting frame is swung on its axis, said telescoping shafts being arranged to rotate one relative to the other, a first clutch member carried by one of said telescoping shafts, a second clutch member carried by the other of said telescoping shafts, and means respectively connecting said clutch members with the corresponding telescoping shaft whereby in one position of the mower supporting frame said clutch members are engaged in driving relation and in another position said clutch members are separated whereby to interrupt the drive from said power take-off shaft to the mower.

25. In combination, a tractor having a power take-off shaft, a mower supporting frame attached to the tractor for swinging movement about a vertical axis thereon, a mower carried by said frame and including a cutter bar and a driving shaft therefor, and driving connections between said shafts including a first clutch part carried by the power take-off shaft and a second cooperating clutch carried by the power drive shaft, said cooperating clutch parts being so disposed relative to the axis of movement of the mower supporting frame that in one position of the latter the clutch parts are engaged and in another position they are separated, and means serving to maintain said parts in axial alignment whereby said clutch parts are automatically engaged and disengaged, corresponding to the position of the mower supporting frame.

26. In combination, a tractor having a power take-off shaft, a means supporting a mower on the tractor for swinging movement about a substantially vertical axis, and means driving the mower from said power take-off shaft including relatively extensible shaft sections of a length sufficient to maintain said shaft sections in alignment when said mower is swung rearwardly about said vertical axis.

27. In combination, a tractor having a power take-off shaft, a main supporting frame attached to the tractor, a supplemental frame pivoted on the main frame on a vertical axis, a cutter bar carried by the supplemental frame and projecting to one side of the main frame in the normal position of said supplemental frame, means for releasably locking the supplemental frame to the main frame in normal relation thereto, driving connections between the cutter bar and the tractor power take-off shaft, said connections being separable so as to be disabled when the supplemental frame is released from the main frame, and means for maintaining said connections in axial alignment when separated by the release of said supplemental frame, whereby said connections are adapted to be automatically restored when the supplemental frame is returned to its normal operative position relative to the main frame.

28. In combination, a tractor, a mower supporting frame attached at one end to the tractor for swinging movement about a substantially horizontal axis, links connecting the other end of said frame with the tractor and limiting downward movement of the frame, said links being connected with the tractor to provide for upward movement of the frame relative to the tractor without disconnecting the links therefrom, yielding means restraining the upward movement of the frame relative to the tractor, and a mower carried by said frame.

29. In combination, a tractor having a power take-off shaft, a mower comprising a frame pivotally connected with the tractor to swing about a vertical axis, and a cutter bar projecting to one side of the mower frame in the normal position thereof, means for releasably locking the mower frame to the tractor in normal relation thereto and operable to release the mower frame to permit rearward swinging thereof when subjected to an abnormal load, driving connections between the cutter bar and the tractor power take-off shaft, said connections including relatively movable members and means maintaining the latter in operative relation when the mower frame is released, whereby the tractor may be backed to restore the mower frame to normal latched position and to automatically continue the drive to said cutter bar through said relatively movable members.

30. In combination, a tractor having a power take-off shaft, a mower comprising a frame pivotally connected with the tractor to swing about a vertical axis, a cutter bar projecting to one side of the mower frame in the normal position thereof, locking means releasably securing the mower frame to the tractor in normal relation thereto and acting to release the mower frame to permit rearward swinging movement thereof when subjected to excessive pressure due to the cutter bar encountering an obstruction or the like, and driving connections between the cutter bar and the tractor power take-off shaft, said driving connections including relatively movable members supported, at least in part, on the tractor and mower frame, respectively, and not wholly withdrawn when the mower frame is swung rearwardly out of its normal position, whereby the tractor may be backed to restore the mower frame to normal latched position and to automatically continue the drive to said cutter bar through said relatively movable members.

31. In combination, a tractor having a power take-off shaft, a mower comprising a frame pivotally connected with the tractor to swing about a vertical axis, a cutter bar projecting to one side of the mower frame in the normal position thereof, locking means releasably securing the mower frame to the tractor in normal relation thereto and acting to release the mower frame to permit rearward swinging movement thereof when subjected to excessive pressure due to the cutter bar encountering an obstruction or the like, and driving connections between the cutter bar and the tractor power take-off shaft, said driving connections including a clutch comprising clutch elements in operating engagement in the normal position of the mower frame and moved out of operative engagement when the mower frame is swung rearwardly out of its normal position.

32. In combination, a tractor having a power take-off shaft, a mower comprising a frame pivotally connected with the tractor to swing about a vertical axis, a cutter bar projecting to one side of the mower frame in the normal position thereof, locking means releasably securing the mower frame to the tractor in normal relation thereto and acting to release the mower frame to permit rearward swinging movement thereof when subjected to excessive pressure due to the cutter bar encountering an obstruction or the like, driving connections between the cutter bar and the tractor power take-off shaft, said driving connections including a clutch comprising clutch elements in operating engagement in the normal position of the mower frame and moved out of operative engagement when the mower frame is swung rearwardly out of its normal position, and means for maintaining said clutch elements in axial alignment with respect to each other when they have been moved out of operative engagement by the rearward swinging of the mower frame.

33. In combination, a tractor having a power take-off shaft, a mower comprising a frame pivotally connected with the tractor to swing about a vertical axis, a cutter bar projecting to one side of the mower frame in the normal position thereof, a mower drive shaft eccentric to the pivot of the mower frame and carried thereby, driving connections between said drive shaft and the cutter bar, a transmission shaft having driving connection with the mower shaft and telescoping the tractor power take-off shaft, a clutch member secured to the power take-off shaft, a clutch member secured to the transmission shaft, said clutch members establishing driving connection between the power take-off shaft and the transmission shaft when the mower frame is in its normal position relative to the tractor, and locking means for releasably securing the mower frame to the tractor in its normal relation thereto, the cutter bar extending to one side of the main frame when the mower frame is in normal position and the locking means being adapted to yield under excessive pressure applied thereto due to the cutter bar encountering an obstruction so as to release the mower frame and permit rearward swinging thereof to enable the cutter bar to clear such obstruction, this rearward swinging movement of the supplemental frame disengaging the clutch members but not withdrawing the transmission shaft from the power take-off shaft.

34. In combination, a tractor having a power take-off shaft, a mower comprising a frame pivotally connected with the tractor to swing about a vertical axis, a cutter bar projecting to one side of the mower frame in the normal position thereof, means for releasably locking the mower frame to the tractor in normal relation thereto, said means being adapted to be released by excessive pressure applied thereto due to the cutter bar encountering an obstruction so as to permit rearward swinging movement of the cutter bar, a mower drive shaft carried by the mower frame eccentric to the pivot thereof, said tractor having a tubular power take-off shaft, a transmission shaft having driving connection with the forward end of the mower shaft and telescoping into the tractor shaft, a clutch member secured to the transmission shaft, a second clutch member mounted on and driven by the power take-off shaft, and yielding means for holding the second clutch member in operative relation to the first clutch member when the mower frame is in normal position, the transmission shaft being shifted relative to the power take-off shaft to disengage the clutch members when the mower frame is released and swung rearwardly.

In witness whereof, I hereunto subscribe my name this 25th day of October, 1929.

TALBERT W. PAUL.